3,850,925
2-MONO- AND 2-DIALKYLAMINOQUINOXALINES

Klaus Sasse, Schildgen, Ingeborg Hammann, Cologne, Günter Unterstenhöfer, Opladen, and Paul-Ernst Frohberger, Leverkusen, Germany, assignors to Bayer Aktiengesellschaft, Leverkusen, Germany
No Drawing. Filed Aug. 28, 1972, Ser. No. 284,378
Claims priority, application Germany, Sept. 8, 1971, P 21 44 879.3
Int. Cl. C07d 51/78
U.S. Cl. 260—250 Q
9 Claims

ABSTRACT OF THE DISCLOSURE 2-mono- and 2-dialkylaminoquinoxalines of the formula:

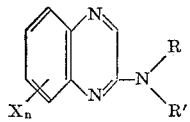

in which

R is hydrogen, or alkyl or alkenyl of up to 5 carbon atoms,
R' is alkyl or alkenyl of 2 to 5 carbon atoms,
X is halogen, methyl or trifluoromethyl, and
$n$ is 0, 1, 2 or 3, and their salts, which possess insecticidal, acaricidal and fungicidal properties.

---

The present invention relates to and has for its objects the provision of particular new 2-mono- and 2-dialkyl-aminoquinoxalines, i.e., optionally halo, methyl or trifluoromethyl-substituted 2-mono- or di-alkyl or -alkenyl-aminoquinoxalines, and their salts, which possess insecticidal, acaricidal and fungicidal properties, active compositions in the form of mixtures of such compounds with solid and liquid dispersible carrier vehicles, and methods for producing such compounds and for using such compounds in a new way especially for combating pests, e.g. insects, acarids and fungi, with other and further objects becoming apparent from a study of the within specification and accompanying examples.

It is known from German patent specification 1,117,586 that 2-alkylamino-3-alkylmercaptoquinoxalines are acaricidally effective but their use is not practical, i.e., since they additionally cause plant damage, they cannot be applied in the necessary concentrations.

2-aminoquinoxalines have already been described but all N-unsubstituted 2-aminoquinoxalines as well as the compounds mentioned in J. Chem. Soc., *1957*, 3236, with methylamino, dimethylamino, benzylamino or morpholino radicals are acaricidally and fungicidally ineffectual.

The present invention provides 2-aminoquinoxalines of the following formula or their salts:

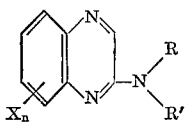

in which

R is hydrogen, or alkyl or alkenyl of up to 5 carbon atoms,
R' is alkyl or alkenyl of 2 to 5 carbon atoms,
X is halogen, methyl or trifluoromethyl, and
$n$ is 0, 1, 2 or 3.

These 2-aminoquinoxalines and their salts with organic or inorganic acids exhibit strong acaricidal, insecticidal and fungicidal properties. Moreover in activity and toleration by plants they exceed the known 2-amino-3-alkylmercaptoquinoxalines. The substances according to the invention therefore represent an enrichment of the art.

The invention also provides a process for the production of a compound according to the invention in which a 2-haloquinoxaline of the general formula:

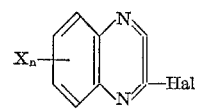

in which

X and $n$ have the same meanings as in formula I, and
Hal is bromine or chlorine, is reacted with a primary or secondary amine of the general formula:

in which

R and R' have the same meanings as in formula I, and, if a salt is desired and the product is not such salt, the product is reacted with an acid, or, if the free 2-aminoquinoxaline is desired and the product is a salt, the product is reacted with a base.

As salt forming acids, all inorganic or organic mono- and poly-basic acids are suitable. Examples include hydrogen fluoride, chloride, bromide or iodide, phosphoric, sulfuric, nitric, boric or carbonic acid, acetic acid, oxalic acid, succinic acid, tartaric acid and their homologues; aromatic carboxylic acids, aliphatic and aromatic sulfonic acids; fluoroboric acid, and hexafluorosilicic acid.

The substances according to the invention are unambiguously defined by the formula I. As examples of these compounds, there are mentioned in particular the following 2-aminoquinoxalines and their salts with the acids mentioned above:

2-ethylamino-quinoxaline
2-propylamino-quinoxaline
2-isopropylamino-quinoxaline
2-butylamino-quinoxaline 2-isobutylamino-quinoxaline
2-sec.-butylamino-quinoxaline
2-tert.-butylamino-quinoxaline
2-pentylamino-quinoxaline
2-(2-methyl-butylamino)-quinoxaline
2-(3-methyl-butylamino)-quinoxaline
2-(1-ethyl-propylamino)-quinoxaline
2-allylamino-quinoxaline
2-methallylamino-quinoxaline
2-crotylamino-quinoxaline
2-(3,3-dimethyl-allylamino)-quinoxaline
2-propinyl-amino-quinoxaline
2-(butin-(3)-yl-(2)-amino)-quinoxaline
2-(1,1-dimethyl-propinylamino)-quinoxaline
2-diethylamino-quinoxaline
2-dipropylamino-quinoxaline
2-diisopropylamino-quinoxaline
2-dibutylamino-quinoxaline
2-diisobutylamino-quinoxaline
2-dipentylamino-quinoxaline
2-diallylamino-quinoxaline
2-(N-methyl-N-propyl-amino)-quinoxaline
2-(N-methyl-N-butyl-amino)-quinoxaline
2-(N-ethyl-N-isopropylamino)-quinoxaline
2-(N-methyl-N-propinyl-amino)-quinoxaline
2-(N-isopropyl-N-(1,1-dimethyl-propinyl)-amino)-quinoxaline
2-dipropylamino-6-chloro-quinoxaline
2-dibutylamino-6-chloro-quinoxaline
2-dipropylamino-7-chloro-quinoxaline
2-dibutylamino-7-chloro-quinoxaline
2-dipropylamino-6-bromo-quinoxaline
2-dipropylamino-6-fluoro-quinoxaline
2-dipropylamino-5,7-dichloro-quinoxaline
2-dipropylamino-5,6,8-trichloro-quinoxaline
2-dipropylamino-6,7-dichloro-quinoxaline
2-dipropylamino-6-methyl-quinoxaline
2-dipropylamino-7-methyl-quinoxaline
2-dipropylamino-6-trifluoromethyl-quinoxaline.

Some of the possibly substituted 2-haloquinoxalines of formula II which are required as starting materials are known. Those which have not been described individually can also be prepared according to previously described methods, for example from corresponding 2-hydroxy-quinoxalines by reaction with phosphorus oxychloride or thionyl chloride. The amine components required as further starting materials are largely known.

The reaction between the 2-haloquinoxalines of formula II and the amines of formula III is normally carried out in the presence of a solvent or diluent. For this purpose one may use any solvent or diluent which in the reaction conditions does not react with the amine or the haloquinoxaline, for example an aliphatic or aromatic hydrocarbon or chlorinated hydrocarbon, an alcohol, a ketone, an aliphatic or cyclic ether, a carboxylic acid amide or a carboxylic acid nitrile or dimethyl sulfoxide. The reaction can be carried out in a mixture of any of these solvents with water.

The halogen hydride liberated in the reaction can be bound by the reaction product itself, which contains two basic functions, the compound of the invention being obtained directly in the form of a salt. This case can occur when the 2-haloquinoxaline and the primary or secondary amine are used in equimolar proportion. However, in order to bind the halogen hydride it is also possible to use a second mole of the amine concerned or to use, instead of this, another acid acceptor, for example a tertiary amine, an alkaline earth metal hydroxide, or an alkali metal or alkaline earth metal carbonate or acetate.

The reaction between the compounds of formulae II and III can be carried out within a wide temperature range, for example 0–200° C. Preferably, it is carried out at 20–150° C.

If the amine is one of the more volatile amines, it may be desirable to carry out the reaction in a closed vessel under the pressure which sets in according to the vapor pressure of the solvent and amine concerned.

The working up of the reaction mixture may take place in customary manner, for example by distilling off or diluting the solvent with water or filtration. If the reaction product is first obtained as a salt, it can be converted into the free 2-aminoquinoxaline (if the latter is desired) by reaction with a base.

The active compounds according to the invention show insecticidal effectiveness, especially against biting insects. They are further distinguished by very good acaricidal effectiveness.

In the case of the biting insects, above all there should be mentioned butterfly caterpillers (*Lepidoptera*) such as the diamond-back moth (*Plutella maculipennis*), the gypsy moth (*Lymantria dispar*), the brown-tail moth (*Euproctis chrysorrhoea*) and tent caterpillar (*Malacosom neustria*); further the cabbage moth (*Mamestra brassicae*) and the cutworm (*Agrotis segetum*), the large white butterfly (*Pieris brassicae*) and the small winter (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kuhniella*) and greater wax moth (*Galleria mellonella*).

Also to be classed with the biting insects are beetles (*Coleoptera*), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blossom beetle (*Meligthes aeneus*), the raspberry beetle (*Byturus tomentosus*), the bean weevil (*Bruchidius = Acanthoscelides obtectus*), the leather beetle (*Dermestes frischie*), the khapra beetle (*Trogoderma granarium*), the flour beetle (*Tribolium castaneum*), the northern corn billbug (*Calandra or Sitophilus zeamais*), the drugstore beetle (*Stregobium paniceum*), the yellow mealworm (*Tenebrio molitor*) and the sawtoothed grain beetle (*Oryzaephilus surinamensis*), and also species living in the soil, for example wireworms (*Agriotes spec.*) and larvae of the cockchafer (*Melolontha melolontha*); cockroaches, such as the German cockroach (*Blattella germanica*), American cockroach (*Periplaneta americana*), Madeira cockroach (*Leucophaea or Rhyparobia maderae*), oriental cockroach (*Blatta orientalis*), the giant cockroach (*Blaberus giganteus*) and the black giant cockroach (*Blaberus fuscus*) as well as (*Henschoutedenia flexivitta*); further, Orthoptera, for example the house cricket (*Acheta domesticus*); termites such as the eastern subterranean termite (*Reticulitermes flavipes*) and Hymenopetra such as ants for example the garden ant (*Lasius niger*).

With the mites (*Acari*) there are classed, in particular, the spider mites (*Tetranychidae*) such as the two-spotted spider mite (*Tetranychus urticae*) and the European red mite (*Paratetranychus pilosus=Panonychus ulmi*), gall mites, for example the black current gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*).

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kalons, clays, alumina, silica, chalk, i.e., calcium carbonate, talc, attapulgite, montmorillonite, kieselguhr, etc.) and ground synthetic mineral (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and fungicides, or bactericides, rodenticides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–10%, preferably 0.01–1% by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The compounds according to the invention possess a high fungitoxic efficiency and show a broad activity spectrum.

They are, in practice, usable preferably as seed dressings against seed-borne fungal plant diseases, particularly in cereals, and are also effective against phytopathogenic soil fungi when they are applied as seed dressings or as soil treatment agents.

In the case of seed treatment there are required, in general, amounts of active compound of 0.01 to 10 g. per kg. seed, preferably 0.05 to 5 g. per kg.

For soil treatment, amounts of active compound of 1 to 500 g. per cubic meter of soil, preferably 10 to 200 g., are generally necessary.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and fungi, and more particularly methods of combating at least one of insects and acarids, which comprise applying to at least one of correspondingly (a) such insects, (b) such acarids, (c) such fungi, and (d) the corresponding habitat thereof, i.e., the locus to be protected, a correspondingly combative or toxic amount, i.e., an insecticidally, acaricidally or fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Tetranychus test/resistant

Solvent: 3 parts by weight dimethyl formamide
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 1.

TABLE 1
(Plant-damaging mites)
Tetranychus test/resistant

| Active compound | | Concentration of active compound in percent | Degree of destruction in percent after 2 days |
|---|---|---|---|
| (A) | 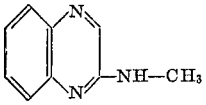 (known) | 0.2 | 0 |
| (B) | 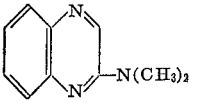 (known) | 0.2 | 0 |
| (C) | 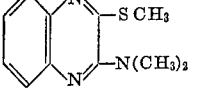 (known) | 0.2 | 0 |
| (D) | 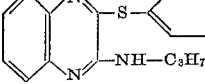 (known) | 0.2 | 0 |
| (3) | 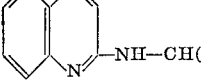 | 0.2 | 100 |
| (1) | 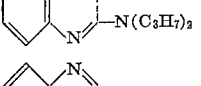 | 0.2<br>0.02 | 100<br>100 |
| (7) | 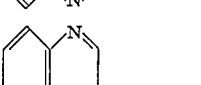 | | 100 |
| (6) | 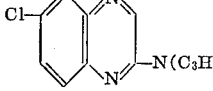 | 0.2<br>0.02 | 100<br>95 |
| (8) | 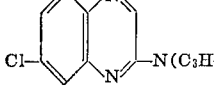 | 0.2<br>0.02 | 100<br>100 |
| (10) | 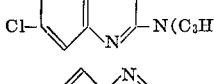 | 0.2<br>0.02 | 100<br>65 |
| (12) | 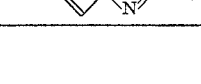 | 0.2 | 100 |
| (15) | 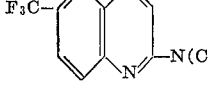 | 0.2 | 100 |

EXAMPLE 2

Plutella test (plant-damaging insects)

Solvent: 3 parts by weight dimethyl formamide
Emulsifier: 1 part by weight alkylaryl polyglycol ether.

To produce a suitable preparation of active compounds, 1 part by weight of the active compound is mixed with the stated amount of solvent containing the stated amount of emulsifier and the concentrate is diluted with water to the desired concentration.

Cabbage leaves (*Brassica oleracea*) are sprayed with the preparation of the active compound until dew moist and are then infested with caterpillars of the diamondback moth (*Plutella maculipennis*).

After the specified periods of time, the degree of destruction is determined as a percentage: 100% means that all the caterpillars are killed whereas 0% means that none of the caterpillars are killed.

The active compounds, the concentrations of the active compounds, the evaluation times and the results can be seen from the following Table 2.

TABLE 2
(Plant-damaging insects)
Plutella Test

| Active compounds | | Concentration of active compound in percent | Degree of destruction in percent after 3 days |
|---|---|---|---|
| (C) | 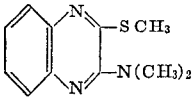 (known) | 0.2 | 0 |
| (10) | 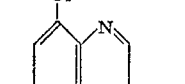 | 0.2 | 100 |
| (11) | 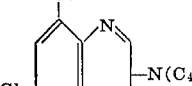 | 0.2 | 100 |

EXAMPLE 3

Seed dressing test/bunt of wheat (seed-borne mycosis)

To produce a suitable dry dressing, the active compound is extended with a mixture of equal parts by weight of talc and kieselguhr to give a finely powdered mixture with the desired concentration of the active compound.

Wheat seed is contaminated with 5 g. of the chlamydospores of *Tilletia caries* per kg. of seed. To apply the dressing, the seed is shaken with the dressing a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the active compound.

The active compounds, the concentrations of the active compounds in the dressing, the amounts of dressing used and the percentage spore germination can be seen from the following Table 3.

The active compounds, the concentration of the active compounds in the dressing, the amounts of dressing used TABLE 3
Seed dressing test/bunt of wheat

| Active compounds | | Concentration of active compound in the dressing in percent by weight | Applied amount of dressing in g./kg. seed | Spore germination in percent |
|---|---|---|---|---|
| Non-dressed | | | | >10 |
| (E) | CH₂—NHC(=S)S\Zn/CH₂—NHC(=S)S (structure) | 10 | 1 | 5 |
| (known) | | | | |
| According to the invention— | | | | |
| (2) | quinoxaline—NH—C₂H₅ | 3 | 1 | 0.05 |
| | | 10 | 1 | 0.005 |
| | | 30 | 1 | 0.000 |
| (4) | quinoxaline—NH—CH₂—CH=CH₂ | 10 | 1 | 0.0 |
| | | 30 | 1 | 0.005 |
| (3) | quinoxaline—NH—CH(CH₃)₂ | 10 | 1 | 0.005 |
| | | 30 | 1 | 0.000 |

EXAMPLE 4

Seed dressing test/stripe disease of barley (seed-borne mycosis)

To produce a suitable dry dressing, the active compound is extended with a mixture of equal parts by weight of talc and kieselguhr to give a finely powdered mixture with the desired concentration of active compound.

To apply the dressing, barley seed, which is naturally infested by *Helminthosphorium gramineum*, is shaken with the dressing in a closed glass flask. The seed, on moist filter paper discs in closed Petri dishes, is exposed to a temperature of 40° C. for 10 days in a refrigerator. The germination of the barley, and possibly also of the fungus spores, is thereby initiated. Two batches of 50 grains of the pregerminated barely are subsequently sown 2 cm. deep in Frustorfer standard soil and cultivated in a greenhouse at temperatures of about 18° C. in seed boxes which are exposed to light for 16 hours daily. The typical symptoms of the stripe disease develop within 3 to 4 weeks.

After this time, the number of diseased plants is determined as a percentage of the total number of emerged plants. The fewer plants are disease, the more effective is the active compound.

and the number of diseased plants can be seen from Table 4.

TABLE 4
Seed dressing test/stripe disease of barley

| Active compound | | Concentration of active compound in the dressing in percent by weight | Applied amount of dressing in g./kg. seed | Number of stripe diseased plants as a percentage of the total number of emerged plants |
|---|---|---|---|---|
| Non-dressed | | | | 44.3 |
| (E) | CH₂—NHC(=S)S\Zn/CH₂—NHC(=S)S (structure) | 30 | 2 | 38.1 |
| (known) | | | | |
| According to the invention— | | | | |
| (2) | quinoxaline—N(C₂H₅)₂ | 30 | 2 | 10.9 |

The following further examples are set forth to illustrate, without limitation, the process for producing the active compounds according to the present invention.

EXAMPLE 5

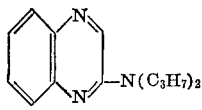
(I)

32.1 g. (0.2 mole) of 2-chloroquinoxaline and 44.4 g. (0.44 mole) of dipropylamine were heated in 150 ml. of dioxane in a closed vessel to 150° C. for 3 hours. The reaction mixture was evaporated in a vacuum, the residue was well worked through with water and dried. Yield: 39.4 g. (86% of theory) of 2-dipropylaminoquinoxaline. M.p. 63° C. (after recrystallization from methanol).

In corresponding manner there were obtained the compounds listed in the following table which corresponded to the general formula:

What we claim is:
1. A 2-aminoquinoxaline or a salt of a 2-aminoquinoxaline of the formula

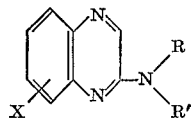

in which
R is alkyl or alkenyl each of 3 or 4 carbon atoms,
R' is hydrogen or R, and
X is chloro, dichloro or trifluoromethyl.
2. The compound according to claim 1 wherein such compound is 2-dibutylamino-6-chloro-quinoxaline of the formula

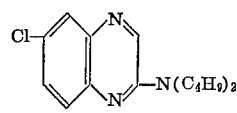

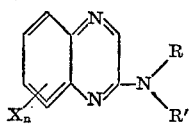

| Compound number | $X_n$ | R' | R | M.P. (° C.) | Recrystallized from— |
|---|---|---|---|---|---|
| 2 | | $C_2H_5$ | H | 66–68 | Ligroin. |
| 3 | | $CH(CH_3)_2$ | H | 71–72 | Benzine. |
| 4 | | $CH_2-CH=CH_2$ | H | 122 | Do. |
| 5 | | $C_2H_5$ | $C_2H_5$ | 61–62 | Do. |
| 6 | | $C_4H_9$ | $C_4H_9$ | 62–63 | Ligroin. |
| 7 | | $CH_2-CH=CH_2$ | $CH_2-CH=CH_2$ | Oil $n_D^{20}$:1.6102 | |
| 8 | 6-Cl | $C_3H_7$ | $C_3H_7$ | 50–51 | Do. |
| 9 | 6-Cl | $C_4H_9$ | $C_4H_9$ | 78–79 | Do. |
| 10 | 5,7-di-Cl | $C_3H_7$ | $C_3H_7$ | 49–50 | Methanol. |
| 11 | 5,7-di-Cl | $C_4H_9$ | $C_4H_9$ | 60–61 | Do. |
| 12 | 6,7-di-Cl | $C_3H_7$ | $C_3H_7$ | 75–76 | Ethanol. |
| 13 | 6,7-di-Cl | $C_4H_9$ | $C_4H_9$ | 89–90 | Do. |
| 14 | 6-$CF_3$ | $C_3H_7$ | $C_3H_7$ | B.P. 126°/0.08 mm. Hg | |
| 15 | 6-$CF_3$ | $C_4H_9$ | $C_4H_9$ | (B.P. 130–131°/0.08 mm. Hg) m.p. 43° | |

EXAMPLE 6

4 g. of dry hydrogen chloride were introduced at room temperature into a solution of 22.9 g. (0.1 mole) of 2-dipropylaminoquinoxaline in 100 ml. benzene. The hydrochloride of the 2-dipropylaminoquinoxaline precipitated in the form of light-yellow crystals which were filtered off with suction and dried. Yield: quantitative; m.p. 164–165° C.

EXAMPLE 7

6 g. (0.1 mole) of acetic acid were introduced into a solution of 22.9 g. (0.1 mole) of 2-dipropylaminoquinoxaline in 100 ml. of benzene. Subsequently, the solvent was distilled off in a vacuum. The acetic acid salt of the 2-dipropylaminoquinoxaline remained behind in quantitative yield. m.p.: 52–54° C.

In corresponding manner there were obtained the salts of:

2-dipropylamino-quinoxaline with oxalic acid; m.p. 84–86° C.

2-dipropylamino-quinoxaline with tartaric acid; m.p. 78–79° C.

2-dipropylamino-quinoxaline with citric acid; m.p. 88–90° C.

2-dipropylamino-quinoxaline with benzoic acid; m.p. 37–39° C.

It will be appreciated that the instant specification and examples are set forth by way of illustration and not limitation and that various modifications and changes may be made without departing from the spirit and scope of the present invention.

3. The compound according to claim 1 wherein such compound is 2-dibutylamino-5,7-dichloro-quinoxaline of the formula

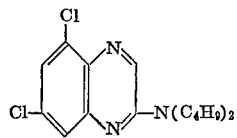

4. The compound according to claim 1 wherein such compound is 2-dipropylamino-6,7-dichloro-quinoxaline of the formula

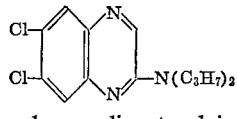

5. The compound according to claim 1 wherein such compound is 2-dibutylamino-6,7-dichloro-quinoxaline of the formula

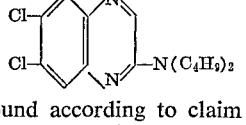

6. The compound according to claim 1 wherein such compound is 2-dipropylamino-6-trifluoromethylquinoxaline of the formula

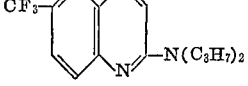

7. The compound according to claim 1 wherein such compound is 2-dibutylamino-6-trifluoromethylquinoxaline of the formula

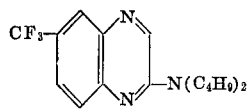

8. The compound according to claim 1 wherein such compound is 2-dipropylamino-6-chloro-quinoxaline of the formula

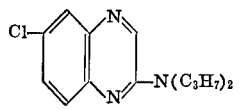

9. The compound according to claim 1 wherein such compound is 2-dipropylamino-5,7-dichloro-quinoxaline of the formula

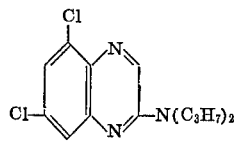

References Cited

Sasse et al.: Chemical Abstract, 57:4684i, of Ger. Off. 1,117,586 (Nov. 23, 1961).

Geigy: Chemical Abstract 55:2005e, of British Pat. 822,069, Oct. 21, 1959.

Molnar: Helv. Chim. Acta, 46(5), 1779–83 (1963), Chemical Abstract, 59:8628b.

DONALD G. DAUS, Primary Examiner

R. D. McCLOUD, Assistant Examiner

U.S. Cl. X.R.

71—92, 88; 260—247.1; 424—250, 248

CERTIFICATE OF CORRECTION

Patent No. 3,850,925　　　　　　　Dated November 26, 1974

Inventor(s) Klaus Sasse et al

It is certified that error appears in the above-identified patent and that said Letters Patent are hereby corrected as shown below:

Col. 2, line 22, delete the structural formula and substitute therefor

"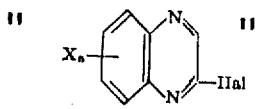"

Col. 4, line 34, correct the spelling of "Meligethes";

line 54, correct the spelling of Hymenoptera".

Col. 5, line 27, correct the spelling of "kaolins".

Col. 7, Table 1, second heading, line 47, insert "0.2";

Col. 7, Table 1, first heading, delete structural formula for compound (8) and substitute therefor:

"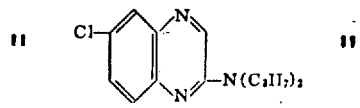"

Col. 8, line 63, after "dressing" insert -- in --.

CERTIFICATE OF CORRECTION

Patent No. 3,850,925  Dated November 26, 1974

Inventor(s) Klaus Sasse et al

It is certified that error appears in the above-identified patent and that said Letters Patent are hereby corrected as shown below:

Col. 9, Table 3, fourth heading, for compound (4), delete "0.0 " and substitute -- 0.5 --
0.005                                       0.000

Col. 9, line 74, delete "disease" and substitute therefor -- diseased --.

Signed and sealed this 3rd day of June 1975.

(SEAL)
Attest:

RUTH C. MASON
Attesting Officer

C. MARSHALL DANN
Commissioner of Patents
and Trademarks